US008632891B2

(12) United States Patent
De Smet et al.

(10) Patent No.: US 8,632,891 B2
(45) Date of Patent: Jan. 21, 2014

(54) ALUMINIUM COMPOSITE SHEET MATERIAL

(75) Inventors: Peter De Smet, Sint-Martens-Latem (BE); Marc-Jan De Haas, HA Alkmaar (NL)

(73) Assignee: Aleris Aluminum Duffel BVBA, Duffel (BE)

( * ) Notice: Subject to any disclaimer, the term of this patent is extended or adjusted under 35 U.S.C. 154(b) by 0 days.

(21) Appl. No.: 13/561,360

(22) Filed: Jul. 30, 2012

(65) Prior Publication Data

US 2012/0288732 A1 Nov. 15, 2012

Related U.S. Application Data

(60) Division of application No. 13/167,747, filed on Jun. 24, 2011, which is a continuation of application No. 12/297,302, filed as application No. PCT/EP2007/003447 on Apr. 19, 2007, now Pat. No. 7,968,211.

(51) Int. Cl.
*B32B 15/01* (2006.01)
*B32B 15/04* (2006.01)
*B32B 15/20* (2006.01)

(52) U.S. Cl.
USPC ........... 428/654; 428/650; 428/213; 428/215; 428/332

(58) Field of Classification Search
USPC .......................... 428/650, 654, 213, 215, 332
See application file for complete search history.

(56) References Cited

U.S. PATENT DOCUMENTS

| 3,192,752 A | 7/1965 | Dowd et al. |
| 3,496,620 A | 2/1970 | Wolfe, Jr. |
| 2003/0127165 A1 | 7/2003 | Magnusen et al. |
| 2004/0062946 A1 | 4/2004 | Benedictus et al. |
| 2005/0000678 A1 | 1/2005 | Van Der Winden |

FOREIGN PATENT DOCUMENTS

| JP | 05-318147 | * | 12/1993 |
| JP | 06-228690 | * | 8/1994 |
| JP | 2004-285391 A1 | | 10/2004 |
| WO | 2004/112992 A2 | | 12/2004 |
| WO | 2006/053701 A2 | | 5/2006 |
| WO | 2010/126987 A1 | | 11/2010 |

OTHER PUBLICATIONS

Machine Translation, Kikuchi et al., JP 06-228690, Aug. 1994.*
Machine Translation, Matsuo et al., JP 05-318147, Dec. 1993.*
Hufnagel, W., "Key to Aluminum Alloys, 4th Edition," 1991 (no month), pp. 195-205.*
Non-Final Office Action of Feb. 1, 2012 from U.S. Appl. No. 12/297,293 to Lahaije, filed Jan. 12, 2009.
Final Office Action of Oct. 22, 2012 from U.S. Appl. No. 12/297,293 to Lahaije, filed Jan. 12, 2009.
Final Office Action of Oct. 24, 2012 from U.S. Appl. No. 11/718,686 to LaHaye, filed Jan. 12, 2009.
Aluminium Standards and Data (Tables 1.1 and 1.2), The Aluminum Association (2006).
Registration Record Series (Teal Sheets) International Alloy Designations and Chemical Composition Limits for Wrought Aluminum and Wrought Aluminum Alloys. The Aluminum Association (2006).
Office action mailed Mar. 19, 2013 for U.S. Appl. No. 13/167,747, to De Smet filed Jun. 24, 2011.
"Novelis FusionTM AS-250"—for multiple automotive parts, Product Datasheet, Novelis Inc. (Aug. 25, 2008).
"Novelis FusionTM AF-350"—for automotive door inners, Product Datasheet, Novelis Inc. (Aug. 25, 2008).
MetalBulletin Glossary—definition of Clad metals, Emirates Aluminium, published by Metal Bulletin Ltd. (2010).
Online tools—Metals Glossary—Aluminium (C)—definition of Clad Material; URL: < http://www.aalco.co.uk/online-tools/glossary/aluminium/c >, retrieved from the Internet, Apr. 9, 2013, (Jan. 2013).
Constellium, Glossary, definition of Clad sheet, URL: < http://www.constellium.com/aluminium-company/aluminium-properties-and-uses/glossary>, retrieved from the Internet, Apr. 9, 2013.
Wilsons Aluminium Alloy—Glossary of Terms for Aluminium, definition of clad material; URL: < http:// www.wilsonsmetals.com/datasheets/Wilsons-Ltd_Aluminium-Alloy_Glossary-of-Terms-for-Aluminium_234.pdf >, p. 5, retrieved from the Internet Apr. 9, 2013.

* cited by examiner

*Primary Examiner* — Michael La Villa
(74) *Attorney, Agent, or Firm* — Novak Druce Connolly Bove + Quigg LLP

(57) ABSTRACT

Automotive body sheet in the form of an aluminum composite sheet material wherein a clad sheet is applied to at least one side of a core material, and wherein the core material is of an aluminum alloy selected from the group consisting of AA2xxx, AA5xxx and AA7xxx-series alloys, and wherein the clad sheet includes an AA6xxx-series alloy having less than 0.2 wt. % Cu or an AA5xxx-series alloy having less than 3.6 wt. % of Mg.

12 Claims, No Drawings

ALUMINIUM COMPOSITE SHEET MATERIAL

CROSS-REFERENCE TO RELATED APPLICATIONS

This is a divisional of U.S. patent application Ser. No. 13/167,747, filed Jun. 24, 2011, which is a continuation of U.S. patent application Ser. No. 12/297,302, filed Jan. 12, 2009, now U.S. Pat. No. 7,968,211 B2 issued Jun. 28, 2011, which is a §371 National Stage Application of International Application No. PCT/EP2007/003447, filed on Apr. 19, 2007, claiming the priority of European Patent Application No. 06009012.3 filed on May 2, 2006, each incorporated herein by reference.

FIELD OF THE INVENTION

The invention relates to an automotive body sheet in the form of an aluminium composite sheet material in which a clad sheet is applied to at least one side of a core material.

BACKGROUND TO THE INVENTION

Composite materials in brought terms are known from the state of the art, such as for example from international application WO-01/02165. In such a composite material the core material (which determines by far the largest component of the composite material) mainly determines the bulk mechanical properties of the composite material, such as for example the strength thereof. The clad sheet however (which, consequently, only determines a small fraction of the composite material and thus will be of minor importance for the mechanical properties thereof) is in contact with the environment surrounding the composite material and thus will determine the chemical activity, for example to a very large extent the corrosion performance of the composite material.

As examples of aluminium composite materials according to the state of the art firstly brazing sheet having typically an aluminium alloy from the AA3xxx-series as core material (e.g. AA3003) and on one or both sides thereof an aluminium alloy from the AA4xxx-series (e.g. AA4045 or AA4343) as clad sheet, as well as sheets for aeronautical use (core material comprising an aluminium alloy from the AA2xxx-series and clad sheet typically comprising an aluminium alloy from the AA1000-series) such as Alclad 2024-1230 may be mentioned. It is common for such known composite materials that these are developed for a specific use and for fulfilling specific demands.

International patent application WO-00/26020 discloses a composite aluminium panel of two parallel sheets or plates secured to the peaks and troughs of a corrugated aluminium stiffener sheet. The corrugated aluminium stiffener sheet is made from an AlMgMn alloy and having 0.4-5.0% Zn. It is disclosed that the corrugated aluminium sheet has a very good corrosion resistance. However, in certain extreme corrosive environment it may be useful to provide a cladding which further enhances to the corrosion resistance of the alloy product. Such a cladding can be of an AA1000-type alloy, an AA6000-type alloy having more than 1% of alloying additions, and an AA7000-type alloy having more than 0.8% of Zn such as AA7072.

International application WO-98/24571 discloses a multi-layer metal composite product obtained by compound strand casting. The product comprises a core, preferably an aluminium alloy, on at least one side of the core an interlayer bonded to the core and a cladding bonded to the interlayer. Depending on the application of the product, the cladding forming the outersurface of the composite product can be a aluminium brazing alloy for use in brazing sheet, an AA1xxx-series alloy to obtain a mirror like surface finish, or an zinc containing aluminium alloy or zinc or a zinc alloy to improve corrosion resistance.

As will be appreciated herein below, except as otherwise indicated, all aluminium alloy designations refer to the Aluminum Association designations in Aluminium Standards and Data and the Registration Records, as published by the Aluminium Association in 2006.

For this invention "sheet product" refers to a rolled product form over 0.15 mm through 2.5 mm in thickness with sheared, slit, or sawed edges.

For this invention "automotive body sheet" or "ABS" refers to aluminium alloy sheet for automotive body applications, in particular exterior panels, interior panels and structural parts.

For any description of alloy compositions or preferred alloy compositions, all references to percentages are by weight percent unless otherwise indicated.

SUMMARY OF THE INVENTION

It is an object of the present invention to provide an improved aluminium composite material of the type referred to above, which is designed for use as automotive body sheet.

This and other objects and further advantages are met or exceeded by the present invention concerning automotive body sheet in the form of an aluminium composite sheet material wherein a clad sheet is applied to at least one side of a core material, and wherein the core material consists of an aluminium alloy selected from the group consisting of AA2xxx, AA5xxx and AA7xxx-series alloys, and wherein the clad sheet consists of an AA6xxx-series having less than 0.2 wt. % Cu or an AA5xxx-series alloy having less than 3.6 wt. % of Mg.

DETAILED DESCRIPTION OF THE PREFERRED EMBODIMENTS

The present invention provides automotive body sheet in the form of an aluminium composite sheet material wherein a clad sheet is applied to at least one side of a core material, and wherein the core material consists of an aluminium alloy selected from the group consisting of AA2xxx, AA5xxx and AA7xxx-series alloys, and wherein the clad sheet consists of an AA6xxx-series having less than 0.2 wt. % Cu or an AA5xxx-series alloy having less than 3.6 wt. % of Mg.

To date panels for use in vehicles (also referred to as Automotive Body Sheet or ABS) did use only a single aluminium alloy (and thus define what is referred to as non-clad or non-composite systems). Generally, aluminium alloys from the AA5xxx-series are used for inner panel applications, whereas aluminium alloys from the AA6xxx-series are used for outer panel and structural applications. Although by varying the chemical composition of the alloys a wide variation of mechanical properties can be achieved, not all possibilities are applied in practice. For applications in vehicles these possibilities are limited, among others, due to restrictions imposed by corrosion performance. For example, an increase of the Mg-level in AA5xxx-series aluminium alloys indeed enhances the formability as well as strength, but at the same time the corrosion performance (especially the so-called intergranular corrosion) is worsened. Likewise, in AA2xxx- and AA7xxx-series aluminium alloys, an increase of respectively the Cu-level and/or Zn-level (which would be beneficial for the strength-performance) would adversely lead to an increased corrosion sensitivity (especially the so-called filiform corrosion) for painted surfaces, which has restricted usage of these compositions in automotive body sheet applications (inner panel, outer panel and structural applications).

Thus, although the skilled person might want to increase the Mg-, Cu and/or Zn-level in the aluminium sheet for increasing the mechanical properties, the subsequent reduction of the chemical properties, and the corrosion resistance in particular, does not allow it.

According to the present invention the properties of the core sheet material are disconnected from the demands imposed on the surface of the composite material. Thus, the core material can be chosen such as to meet the mechanical demands as good as possible (meaning for the above-mentioned core alloys an increase of the Mg, Cu and Zn levels), whereas the clad sheet can be chosen such as to meet the demands on interaction with the environment. It has been found that a combination of a core material comprising an aluminium alloy from the AA2xxx-, AA5xxx- or AA7xxx-series with a clad sheet comprising an aluminium alloy selected from the group consisting of the AA5xxx-series with less than 3.6 wt. % Mg, and AA6xxx-series with less than 0.2 wt. % Cu can meet such demands.

Furthermore, in vehicles adhesive bonding of automotive body sheets occurs, regulated by specific requirements (although not as stringent as is the case in the aeronautical field). While a non-composite system needed an adequate pre-treatment of its surface, it appears that the composite sheet material according to the present invention does not need so to obtain a sufficient durability as this is already provided for by the choice of the clad layer.

According to an embodiment the AA5xxx-series aluminium alloy of the core has the following chemical composition, in weight percent:

| | |
|---|---|
| Mg | 3.6-6.0, preferably 4.0-4.7 |
| Mn | 0.05-1.2, preferably 0.07-0.8, more preferably 0.2-0.55 |
| Zn | <0.9, preferably <0.45, more preferably <0.3 |
| Fe | <0.55, preferably <0.25 |
| Si | <0.45, preferably <0.2 |
| Cr | <0.3, preferably 0.05-0.25, for example 0.08 to 0.2 |
| Zr | <0.3, preferably 0.05-0.25, for example 0.07 to 0.15 |
| Cu | <0.5, for example <0.15 or 0.2 to 0.5 |
| Ti | <0.2, for example 0.01 to 0.04, | other elements and inevitable impurities, each element<0.05, total<0.2, balance aluminium.

This compositional range encompasses in particular the aluminium alloys from the group of AA5022, AA5023, AA5082, AA5182, AA5186, AA5059, AA5083, AA5058 and AA5088.

Suitable AA2xxx-series core alloys are those having a Cu-content up to 6.8 wt. %, and preferably up to 5.0 wt. %, in particular AA2219, AA2024, AA2324, AA2008, AA2010 and the AA2036-series alloy are suitable for automotive body sheet when clad according to the present invention.

Suitable AA7xxx-series core alloys are those having a Zn-content of up to 9.7 wt. %, and preferably up to 6.5 wt. %, and a Cu-content of up to 2.6 wt. %, and preferably up to 2.0 wt. %, in particular the AA7020, AA7021, AA7029, AA7050, AA7075, AA7003 and AA7004-series alloy are suitable for automotive body sheet when clad according to the present invention.

These alloys are extremely well-fitted for the intended use in the automobile field because of their specific properties, which per se are well known to the skilled person.

For AA5xxx-series core material, this provides the advantage that the good formability of the 5xxx-series alloy can be combined with the very good dent resistance and filiform and intergranular corrosion resistance of the herein defined AA6xxx-series type clad alloy.

For AA2xxx and AA7xxx core material, this provides the advantage that high Cu or high Zn variants like e.g. AA2219 and AA7050 can be chosen as a core for automotive body sheet, so that an overall higher strength is obtained. With respect to hemming performance and corrosion resistance, these type of alloys are generally known to be inferior to that of e.g. a AA6016-series alloy. By cladding the high Cu and/or Zn containing core material with an AA6xxx-series clad material having a low Cu content of less than 0.2%, an overall high strength can be combined with a good hemming performance and a good resistance to filiform and intergranular corrosion, yielding a unique combination of properties. It has been found also that an improved hemming performance results also in an improved crash performance of the automotive body sheet according to the present invention. In particular AA6016-series clad alloys are preferred because of their very good hemming performance, corrosion resistance and their high dent resistance.

In another embodiment the core is clad with an aluminium alloy from the AA5xxx-series with less than 3.6 wt. % of Mg amongst others to obtain a good intergranular corrosion resistance, particularly suitable alloys are chosen from the AA5754, AA5051A or AA5018-series alloys.

The composite sheet product in accordance with the present invention may comprise only one clad sheet applied to only one side of the core material. In another embodiment a clad sheet is applied to both sides of the core material. As a result, the composite material exhibits excellent balanced properties, viz. strength and formability versus corrosion performance, dent resistance and hemming performance.

Although the dimensions of the aluminium composite material can be varied in many ways (mostly imposed by the specific use and concurrent demands), for use as automotive body sheet the core material has a thickness in the range of about 0.5 to 2 mm, preferably about 0.7 to 1.3 mm, and most preferably about 1 mm. The clad layer or clad layers are usually much thinner than the core sheet, each clad layer constituting about 1 to 25% of the total composite sheet thickness. A clad layer or clad sheet more typically constitutes around about 1 to 12% of the total composite sheet thickness.

In a further aspect of the invention it relates to an automotive body panel and automotive structural parts made from the automotive body sheet in the form of a composite sheet material according to this invention.

In a further aspect the invention relates to a method for producing an aluminium composite material in which a clad sheet is applied to at least one side of a core material. In accordance with the present invention the core material comprises an aluminium alloy from the defined AA2xxx-, AA5xxx- or AA7xxx-series, and wherein the defined clad sheet is attached to the core material by means of roll bonding to achieve the require metallurgical bonding between the core sheet and the cladding.

Such a roll bonding process is very economic and results in a very effective composite sheet material presenting the desired properties.

Of course, the roll bonding process may be accompanied by several additional processing steps such as for example annealing for determining the final properties of the automotive body sheet in the form of the composite sheet material.

When carrying out such a roll-bonding process for producing the sheet material according to the present invention, it is preferred that both the core material and clad sheet experience a thickness reduction during the role bonding.

For example the core material initially can be an about 400 mm thick block with at both sides a clad sheet initially about 24 mm thick. After roll bonding the final width of the core material was about 1 mm, whereas the final thickness of the clad layer is, for example, about 60 μm.

It is noted that the initial dimensions and final dimensions of the composite sheet product will be determined both by the specifics of the roll-bonding process as well as the required properties of the final sheet product.

The roll bonding process can be carried out in different manners. For example, it is possible that the roll-bonding process includes both hot rolling and cold rolling.

Further, the roll-bonding process may be a one-step process or a multi-step process in which during successive rolling steps the material is gauged down. Separate rolling steps then may be separated by other processing steps, for example annealing steps, heating steps, cooling steps, etc.

In another embodiment according to this invention the defined cladding sheet is attached to the core material by means of a casting technique, for example as disclosed in EP-1638715, incorporated herein by reference.

As expressed above and set forth in the claims, the aluminium composite material in accordance with the present invention is for use as automotive body sheet in vehicles. The choice of the core material from the AA2xxx-, AA5xxx- or AA7xxx-series leads to excellent mechanical properties as these are substantially determined by the core sheet, and which are at least comparable with standard industrial sheet alloys used for this application. Tests conducted on specimens of the aluminium composite sheet material according to the present invention has showed further that there is no significant correlation between the thickness of the clad sheet and the mechanical properties, thus confirming what has been stated above with respect to disconnecting the bulk properties of the core material from the demands imposed on the clad sheet.

Further, the choice of in particular AA6016-series aluminium alloy as clad sheet enables to obtain an excellent performance of the composite material as regards to the environment. For example, its sensitivity for intergranular corrosion can be limited within acceptable limits, and further its sensitivity for filiform corrosion, especially in combination with painted surfaces, can be reduced.

The invention will now be illustrated with reference to non-limiting embodiments according to the invention.

EXAMPLE 1

On an industrial scale three sheet products have been manufactured and processed to sheet product of 1 mm in an O temper. The three sheet products were a bare AA5182 alloy and an AA5182 alloy clad on both sides with either an AA6016 alloy or AA5051A alloy. The AA5182 is used frequently for automotive body sheet applications. The core of the clad sheet product has the same thermal history as the bare sheet product, for example both have been subjected to a homogenisation treatment of 10 hours at 500° C. The clad sheet product was made using common roll bonding practices of hot-rolling the clad product to an intermediate gauge of 7.5 mm and whereby the hot-mill exit temperature was about 300° C., and then cold rolled to a final gauge of 1 mm. The clad sheet had a total thickness of 1 mm and each clad layer had a thickness of 80 μm.

The exact alloy compositions are listed in Table 1. All products have been solution heat treated at 550° C. and then quenched and then after 2 weeks at room temperature tested while being in the so-called O-temper for its strength, total elongation and hemming performance. The strength, intergranular corrosion resistance and dent-resistance have been measured also simulated cycle whereby the product in the O-temper is further subjected to a 2% cold stretch following by a heat-treatment of 20 minutes at 185° C.

Both the bare sheet product and the clad sheet products have been tested in the O temper for their hemming performance via a flat hemming test (bending the samples 180° with a bending radius of 0.0 mm as included in ASTM norm E290-97A) and followed by a visually assessed. A score was given according to the following rating: rating "5" represents no visual defects, "4" mild surface roughening, "3" severe surface roughening, "2" small surface cracks, and "1" represents continuous surface cracks, and whereby a further sub-rating of for example 3¼, 3½ and 3¾ is used.

Both the bare sheet product and clad sheet products have been assessed for their mechanical properties according to ASTM norm EN10002 for tensile tests. The tensile properties have been determined in the referenced O-temper and also after a simulated cycle. The intergranular corrosion resistance ("IGC) after the simulated cycle has been measured according to the European norm ASTM G67-86 and the result is expressed as weight loss expressed in mg/cm$^2$. In addition the static dent-resistance after the simulated cycle has been measured whereby the product is mounted and subsequently loaded with a steel indentor having a radius of 63.5 mm with a speed of 2 mm/min, such that from the force-displacement curve the static dent-resistance $F_{0.1mm}$ is determined as the force (in N) required to make an indention of 0.1 mm deep. The test results are listed in Table 2.

TABLE 1

Alloy composition in wt. % of the AA6016, AA5051A, and AA5182, balance aluminium and inevitable impurities.

| Alloy | Si | Fe | Cu | Mn | Mg | Cr | Ti |
|---|---|---|---|---|---|---|---|
| AA6016 | 1.0 | 0.23 | 0.15 | 0.07 | 0.60 | 0.03 | 0.02 |
| AA5051A | 0.1 | 0.2 | 0.02 | 0.05 | 1.85 | 0.15 | 0.02 |
| AA5182 | 0.1 | 0.16 | 0.12 | 0.24 | 4.9 | 0.03 | 0.01 |

TABLE 2

Test results of the bare alloy sheet and the alloy sheet clad with AA6016 and AA5051A.

| Property and condition | Bare AA5182 | AA5182 with AA6016 clad | AA5182 with AA5051A clad |
|---|---|---|---|
| Yield strength (MPa) in O temper | 117 | 121 | 113 |
| Total elongation (%) in O temper | 28.5 | 27.7 | 27.9 |
| Hemming in O temper | 3½ | 3.0 | 3½ |
| Yield strength after 2% + 185° C./20 min | 154 | 171 | 144 |
| IGC (mg/cm$^2$) after 2% + 185° C./20 min | 21 | 2 | 3 |
| Dent-resistance $F_{0.1\,mm}$ (N) after 2% + 185° C./20 min | 165 | 181 | 161 |

From the results of Table 2 it can be seen that the clad sheet product with the AA6016 cladding has in increased strength due to the stronger cladding, whereas the formability expressed in elongation remains effective unchanged. Together with the strength also the dent-resistance favourably increases. Despite the use of a AA6xxx-series cladding it has been found that the hemming performance of the clad sheet product is not adversely affected, while the corrosion performance is significantly improved. Although not mentioned in Table 2, but it has had also been found that the susceptibility of the clad product to roping in comparison to the bare sheet product was unchanged.

From the results of Table 2 it can also be seen that the clad sheet product with the AA5051A cladding has a slightly reduced strength and dent-resistance compared to the unclad sheet product, while the formability expressed in elongation remains effectively unchanged. But for this slight reduction in strength a very advantageous improved in corrosion performance is obtained. Furthermore can it be seen that the hemming performance is not affected by the clad sheet.

Although not mentioned in Table 2, but has had also been found that the susceptibility of the clad product to roping in comparison to the bare sheet product was unchanged.

In the present example the core alloys have been clad on both sides for practical reasons in the production thereof, but it will be immediately apparent to the skilled person that the same benefits can be obtained by using only a single clad sheet or clad layer.

This example illustrates the principle of the present invention that the corrosion performance of an AA5000-series alloy suitable for automotive body sheet can be improved by providing it with a suitable cladding layer, while still beneficing from the favourable characteristics of the core sheet such as its strength, formability, hemming performance and dent resistance.

The invention is not limited to the embodiments described before, which may be varied widely within the scope of the invention as defined by the appending claims.

The invention claimed is:

1. Automotive body sheet in the form of an aluminium composite sheet material:
    wherein a clad sheet is applied to at least one side of a core material, and
    wherein the core material consists of an aluminium alloy selected from the group consisting of AA5082 and AA5059-series alloys, and
    wherein the clad sheet consists of an aluminium alloy selected from the group consisting of AA5754 and AA5018-series alloy.

2. Automotive body sheet according to claim 1, wherein the core material consists of an aluminium alloy selected from the group consisting of AA5082 series alloy.

3. Automotive body sheet according to claim 1, wherein the core material consists of an aluminium alloy selected from the group consisting of AA5059-series alloy.

4. Automotive body sheet according to claim 1, wherein the core material has a thickness in a range of 0.5 to 2 mm.

5. Automotive body sheet according to claim 1, wherein the composite sheet material consists of a core material having a clad sheet on one side only.

6. Automotive body sheet according to claim 1, wherein the composite sheet material consists of a core sheet having a clad sheet on both sheet surfaces.

7. Automotive body sheet according to claim 1, wherein the one or both clad sheets have a thickness in a range of 1 to 25% of the total thickness of the composite sheet material.

8. Automotive body sheet according to claim 7, wherein the composite sheet material consists of the core material having the clad sheet on one side only, wherein the core material has a thickness in a range of 0.5 to 2 mm.

9. Automotive body sheet according to claim 7, wherein the composite sheet material consists of the core material having the clad sheet on both sheet surfaces, wherein the core material has a thickness in a range of 0.5 to 2 mm.

10. Automotive body sheet according to claim 1, wherein the one or both clad sheets have a thickness in a range of 2 to 12% of the total thickness of the composite sheet material.

11. Automotive body panel made from the automotive body sheet according to claim 1.

12. Automotive body sheet according to claim 1, wherein the core material has a thickness in a range of 0.7 to 1.3 mm.

* * * * *